United States Patent Office 3,709,973
Patented Jan. 9, 1973

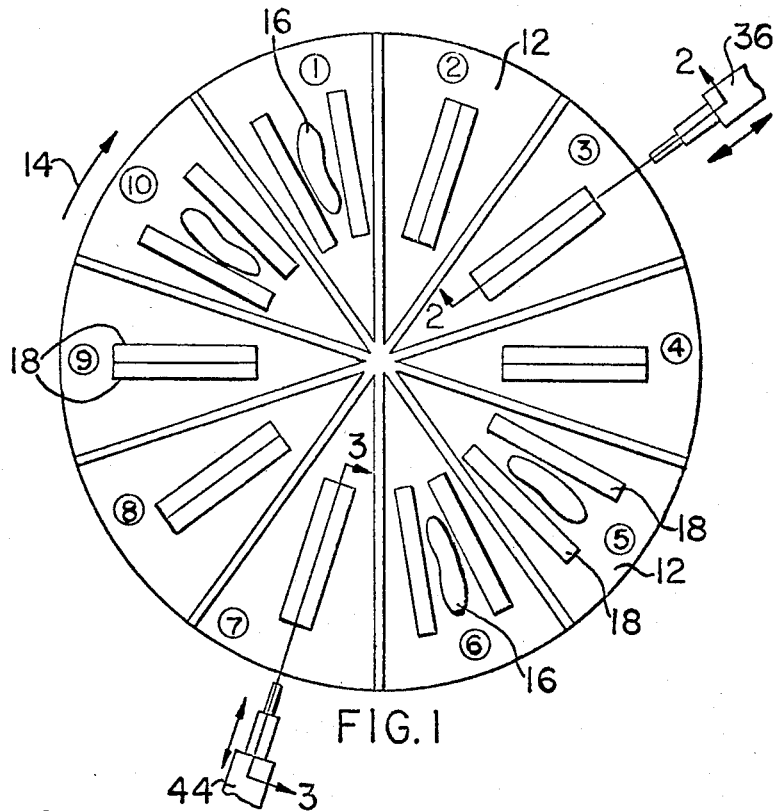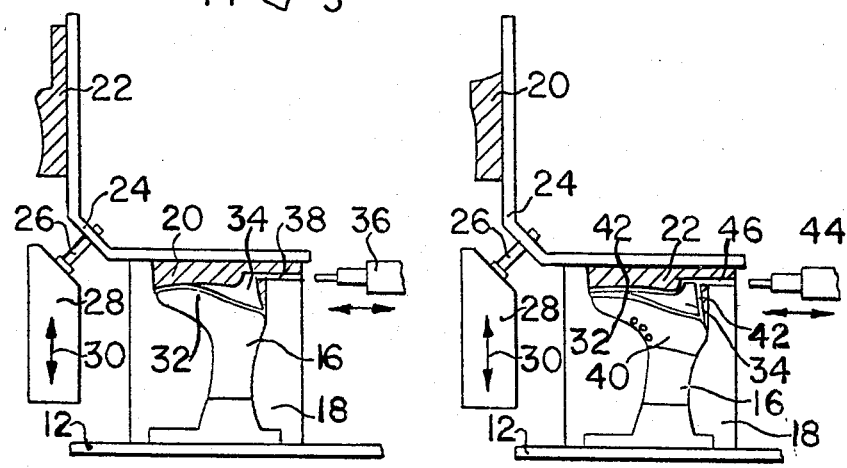

3,709,973
MANUFACTURE OF FOOTWEAR AND/OR COMPONENTS THEREOF BY INJECTION MOLDING OF SYNTHETIC RESINOUS MATERIAL OR OTHER MOLDING MATERIALS
Frank V. Maltby, Don Mills, Ontario, Canada, assignor to Bata Shoe Company, Inc., Belcamp, Md.
Continuation of application Ser. No. 691,851, Dec. 19, 1967. This application Oct. 2, 1970, Ser. No. 77,690
Claims priority, application Canada, Dec. 23, 1966, 978,858
Int. Cl. B29f 1/10
U.S. Cl. 264—244
6 Claims

ABSTRACT OF THE DISCLOSURE

The shaping of an insole and the production of an article of footwear in which an insole blank is positioned on a last member and pressed thereagainst by a first closure member for conforming the insole blank to the shape of the last member. A first molding material is injected into a first molding cavity provided between the insole and the first closure member and an upper is lasted onto the insole carrying last. A second molding material is injected into a second molding cavity provided by a second closure member positioned adjacent the last member.

This application is a continuation of application Ser. No. 691,851 filed Dec. 19, 1967, and now abandoned.

BACKGROUND OF THE INVENTION

The present invention relates to the manufacture of footwear and/or components thereof, and more particularly to the manufacture of footwear and/or components thereof by injection molding of synthetic resinous material or other molding materials.

In accordance with the invention, a molding cavity defining the article of footwear or component thereof to be produced is formed between the various mold members and a first molding material is injected into the cavity under pressure. After the setting or hardening of the first molding material, one or more of the cavity defining mold members can be replaced by another mold defining member or members which define a second cavity which is then filled with additional molding material via a second injection. Thus, by successively exchanging the cavity defining mold members, with each exchange being followed by the injection of molding material into the newly formed cavity, it is possible to produce an article of footwear or component thereof composed of various injections of molding material. The molding material injected at successive injection stations may be identical or may vary as to chemical composition, and physical characteristics such as hardness, durability, color, weight, etc.

The invention further relates to means for the manufacture of footwear or components thereof whereby successive injections of molding material are injected into various cavities provided adjacent the article being manufactured to result in superior, and more economically produced articles of footwear or components thereof.

Heretofore, it has been necessary to provide a "rigid" core before a plastic heel has been injected as part of a sole and heel injection operation. Likewise, a shank reinforcement had to be fastened and positioned correctly on the shoe bottom before injection of the sole has taken place.

This invention removes the necessity of accomplishing the foregoing separately.

It is an object of the invention to provide a method and apparatus for the manufacture of footwear comprising successively forming injection cavities adjacent an article being manufactured and injecting molding material into the thus formed cavities.

SUMMARY OF THE INVENTION

In a preferred form of the present apparatus, a plurality of lasts or lasting members are positioned on a rotatable table or turn table which may be automatically or manually controlled for rotatable movement for bringing each of the last members in sequence to various operational stations positioned around the table. Each last has associated therewith two side molds movably mounted for selected opening and closing against the sides of the last member. Each last member also is provided with two differing upper mold cavity closure members associated therewith and mounted for selective engagement with the side molds when closed to define an injection cavity adjacent the last member around which the article is produced. At one operational station, the first of the two upper closure members is positioned above and adjacent the last member and together with the side molds form a first molding cavity and first molding material is injected into this cavity. After the first material has reached the correct state of setting so that a second injected material will bond thereto, the first upper closure member is removed and the second upper closure member is positioned to define a second molding cavity into which a second molding material is injected at another operational station as the turn table rotates.

It is also an object of the present invention to provide a method and means for shaping or forming the insole for an article of footwear during the injection of various components of the article. In the past, it has been necessary in most instances to form the insole member prior to the building up of the other components of the article, but this invention makes such preforming unnecessary thus resulting in more quickly, and economically produced articles.

In a preferred embodiment of the invention, a precut but not pre-formed insole, that is, a planar insole which may be of any suitable material, is positioned on the sole portion of a last member, the side mold members closed and the first of the upper closure members positioned. The closing of the first upper closure member firmly presses the insole blank between the last member and the side mold members thereby conforming the insole blank to the shape of the last member. At this time, the upper closure member and/or last member may be heated somewhat if heating is found to assist in the forming of the insole which will in most cases be dependent upon the material from which the insole is made. In addition to forming the insole, the first upper closure member is provided with a recess defining a cavity adjacent the shank and heel portions of the insole and into which the first molding material forming a shank and heel reinforcement is injected at a first injection station. After setting of the first molding material, the side mold members and the first upper closure member are removed from contact with the insole and an upper is conventionally, by slip or string lasting, positioned on the last member. The side mold members are then closed and the second upper closure member positioned. The second upper closure member defines a cavity constituting the complete sole and heel of the article and after injection of the second molding material into the second cavity and the setting thereof, the article is removed from the last member as a completed article of footwear.

Variations of the preferred embodiment are possible and are within the scope of the present invention.

In one such variation, the insole and upper may be lasted on the last member prior to the injection of the first molding material forming the heel and shank reinforcement, and in another variation a conventionally lasted (pre-lasted by nailing, adhesives or the like) upper and insole can simply be positioned on the last member prior to the first injection.

In another variation, a conventionally pre-lasted upper could be placed on the last member or an insole and upper string or slip-lasted on the last member, with the first injection forming the complete and whole sole of the article and the second injection adding a heel section of harder material. At the time of the injection of the heel section, a toe section of harder material could also be added by the second injection step.

It is a further object of the invention to provide a method for economically and quickly manufacturing articles of footwear or components thereof comprising positioning an insole blank on a last member, pressing the blank against the last member by a first upper closure member to conform the insole to the shape of the last member, injecting a first molding material into a first cavity defined between the insole and the first closure member, lasting an upper on the insole carrying last member, and injecting a second molding material into a second molding cavity defined by a second closure member positioned adjacent the last member.

It is a still further object to provide a method for manufacturing an article of footwear, comprising the steps of positioning an insole blank on a last member, pressing the insole against the last member by a first closure member to conform the insole to the shape of the last member, injecting a first molding material into a first molding cavity defined by the first closure member adjacent the shank and heel areas of the insole to form a shank and heel reinforcement on the insole blank, lasting an upper onto the insole-carrying last member, and injecting a second molding material into a second molding cavity defined by a second closure member positioned adjacent the insole to form a sole and heel on the insole and upper.

The above and other objects and advantages of the invention will become apparent from the following description in conjunction with the accompanying drawings in which:

BRIEF DESCRIPTION OF THE DRAWINGS

FIG. 1 is a diagrammatic plan view of a rotatably mounted table having a plurality of lasting members and molding members mounted thereon, FIG. 2 is a sectional view taken along the line 2—2 of FIG. 1, and FIG. 3 is a sectional view taken along the line 3—3 of FIG. 1.

DETAILED DESCRIPTION OF THE INVENTION

Referring to FIG. 1, there is illustrated a rotatable table or turn table 12 mounted for controlled intermittent rotation about a vertical axis in the direction indicated by arrow 14. The intermittent rotation may be automatically controlled by timing mechanism or may be manually controlled if desired.

The table is divided into a plurality of stations (10 being shown in the drawings, but this is not critical) and each station consists of an upstanding lasting member or last 16 and two side mold members 18. The last member 16 is stationary but the side mold members 18 are mounted for horizontal movement toward and away from the last member 16. The interior surface of each side mold member 18 facing the last member is recessed to receive one-half of the last member 16 thus making it possible for the side mold members to close tightly against the last member in the molding position. In FIG. 1, the side mold members are shown in the open position or away from the last members at stations 1, 5, 6 and 10, and in the closed position at stations 2, 3, 4, 7, 8 and 9.

Each molding station in addition to the last member and two side mold members is provided with two interchangeable upper closure members 20 and 22 mounted generally above the last member as shown in FIGS. 2 and 3. The two closure members 20 and 22 are secured to the legs of a substantially right angled support member 24 pivotally mounted on an axle or shaft 26 carried by a housing 28. The housing is mounted (by means not shown) for vertical reciprocal movement in the direction denoted by arrow 30. It will be appreciated that by raising the housing 28, it is possible to rotate the support member 24 to bring the desired closure member 20 or 22 above the last member 16, and upon the lowering of the housing 28, the selected closure member will be in position above and adjacent the last member 16.

At station 1 as illustrated in FIG. 1, the side mold members 18 are open and the closure members are raised above the last member 16 to facilitate work on the last member. A pre-cut but not pre-formed or planar insole blank 32 of any suitable material is placed on the sole surface of the last member 16, and may be held thereon by any suitable means (not shown) such as pins carried by the last member and piercing the insole, or pins fitting into corresponding holes provided in the insole. The table is then rotated from station 1 to station 2 during which period the side mold members 18 close against the last member 16 and the closure member 20 is lowered against the top of the last member 16 as shown in FIG. 2. The meeting of the closure member 20 and last member 16 presses the insole 32 therebetween to conform the insole blank to the shape of the last member which possesses the shape of the interior surface of the finished article. At this time, the closure member 20 or last member 16 may be heated by suitable means, such as heating coils (not shown) carried thereby if it is determined that the forming of the insole blank 32 is assisted by heating depending upon the particular blank material.

The upper closure member 20 is provided with a recess in the area where it contacts the shank and heel of the insole, thus forming a molding cavity 34 adjacent the insole in this area. As the table rotates to station 3, a first extruder barrel 36 advances in a known manner and injects molding material into the cavity 34 via an inlet port 38 thus forming a shank and heel reinforcement on the insole being produced.

At station 4 the side mold members 18 and upper closure member 20 remain closed to finish the formation of the insole and allow time for the molding material injected at station 3 to set or solidify. This setting step may be assisted by cooling with suitable means if desired.

At station 5, the side mold members 18 open and the closure member 20 is raised clear of the last member 16 and formed insole carried by the last member. At either station 5 or station 6 (where the mold members are also open) a shoe upper 40 is conventionally string- or slip-lasted onto the last member and over the formed insole which now includes a shank and heel reinforcement.

At this time, the support member 24 is rotated thereby displacing the closure member 22 into position above the last member 16 and during travel from station 6 to station 7, the side mold members 18 close and the closure member 22 is lowered as illustrated in FIG. 3. The closure member 22 defines a whole out sole and heel molding cavity 42 adjacent the last member 16 and the shoe components carried thereby. The cavity 42 is filled with molding material from an extruder barrel 44 via inlet port 46 at station 7. The mold members 18 remain closed at stations 8 and 9, but open at station 10 to permit the removal of the molded footwear article from the last member 16.

An insole blank is then placed on the bare last member 16 at station 1 and the foregoing cycle repeated. Of course, as one insole blank is being mounted at station 1, a previously mounted insole is being formed at station 2, and another heel and shank reinforcement is being injected at station 3, and so on around the stations on the table 12.

Throughout the disclosure and claims reference is made to molding material. This term is meant to define synthetic resinous molding material known in the art, such as polypropylene, ethyl vinyl acetate, polystyrene, polyvinyl chloride, polyethylene, polyvinyl acetate, etc., as well as various blends and copolymers of these materials together with suitable natural products such as rubber, and materials such as polyisoprenes, polybutadienes suitably compounded.

In a second embodiment of the invention, the operational process is generally as listed with regards to the first preferred embodiment with the exception that at station 1 the insole blank is positioned on the last and an upper is immediately lasted on the last by string- or slip-lasting. This eliminates the need for lasting of the upper at stations 5 or 6.

A step-by-step procedure for the second embodiment is as follows:

(1) At station 1, the molds are open, an insole blank is positioned and an upper is conventionally lasted, by slip-lasting or string-lasting thereto.

(2) The side molds and first upper closure member 20 close at station 2 forming the insole and upper to the shape of the last 16. Heating may, if desired, be effected at this station to assist forming.

(3) Injection of the shank and heel reinforcement at station 3 is effected.

(4) Setting of the shank and heel reinforcement at station 4 is accompanied by cooling, if desired, depending upon the material injected by the first barrel 36.

(5) At stations 5 and 6, the side molds and upper closure member 22 are positioned above the last 16.

(6) At station 7, the molds and second closure member 22 close and whole sole and heel injected into the cavity 42.

(7) The molds are closed at stations 8 and 9 to permit setting of injected whole sole, with cooling if desired.

(8) The molds open for removal of the finished molded article.

A variation of the second embodiment would be to mount a conventionally pre-lasted upper and insole at station 1 rather than using the on-the-spot slip-lasting or string-lasting discussed. With the pre-lasted technique, the positioning of the upper and insole on the last member is quicker, thus requiring less time on the part of the operator, but the pre-lasting must have already been completed at another location.

In a third preferred embodiment of the present invention, the step of injecting a sole and heel reinforcement is eliminated and at the first injection station (station 3), a complete sole minus a heel lift is injected onto a lasted insole and upper. The upper may be string- or slip-lasted onto the insole of station 1 or the two components may have been pre-lasted before positioning on the last member at station 1. In this embodiment, the closure member used at station 1 will define a cavity representing a whole sole (minus heel lift) and the injection at station 7 will simply add a heel section to the sole injected at station 1.

Other variations are possible. One such variation being the opening of the side mold members after the pressing of the insole and before the first injection for the lasting of the upper. The molds would then be closed for the first injection. While such a procedure is quite satisfactory, production is slowed somewhat due to the necessity of having an additional separate station for the lasting operation.

It will be appreciated that variations of the embodiments disclosed above may be possible without departing from the scope of the present invention, as the first and second upper closure members may take various cavity forming configurations not specifically disclosed. In essence, the invention covers shoe building wherein the insole is shaped to conform to the shape of the last member during a continuous process of footwear production whereIn two injections are used to build up the sole-heel arrangement. This process provides for quicker and more economically produced footwear with great variations in shoe making techniques.

The preferred form of apparatus is shown in the attached drawings, and discussed in some detail above, but the process can be practised with other apparatus, such as a stationary single-last machine but production would, of course, be greatly reduced.

It is possible to use the illustrated turn table apparatus with only one injection station whereby a whole sole and heel is injected at one time but this, of course, rules out the possibility of having various components of the sole-heel molding of different flexibility and hardness.

The present apparatus may be operated and controlled either manually or automatically. The intermittent rotation of the turn table may be by an electric drive assemblage having automatically timed rotation intervals, and movement of the table may automatically effect the movement of the side molds and upper closure members and injection stations or the whole operation could be manually controlled. Movement of the side molds and closure members could be by pneumatic or hydraulic cylinders, but these suggestions are made only by way of example and not in any limiting sense.

This invention is not to be confined to any strict conformity to the showings in the drawings but changes or modifications may be made therein so long as such changes or modifications mark no material departure from the spirit and scope of the appended claims.

What is claimed is:

1. A method for shaping an insole and producing an article of footwear comprising the steps of positioning a planar insole blank on the sole portion of the last member, pressing the blank by means of a first closure member between the last member and side sole members for conforming at least part of the blank to the configuration of the last member and at the same time providing a first cavity for forming a shank and heel reinforcement on the insole, injecting a first molding material into the first cavity to form an insole and bond a shank and heel reinforcement on the insole, allowing the molding material to set, positioning a second closure member adjacent the last member and side sole members for providing a second cavity for forming the whole outsole and heel on the set insole, injecting a second molding material into the second cavity to form and bond an outsole and heel to the insole, shank and heel reinforcement, and lasting an upper onto the insole.

2. The method for shaping an insole and producing an article of footwear as claimed in claim 1 in which the lasting of the upper to the insole is effected prior to pressing the blank between the last member and side mold members.

3. The method for shaping an insole and producing an article of footwear as claimed in claim 1 in which the lasting of the upper to the insole is effected prior to positioning the blank on the last member.

4. The method for shaping an insole and producing an article of footwear as claimed in claim 1 in which the upper is lasted to the insole following the step of allowing the first molding material to set.

5. The method for shaping an insole and producing an article of footwear as claimed in claim 1 in which the chemical composition and physical characteristics of the molding materials injected into the first and second cavities are identical.

6. The method for shaping an insole and producing an article of footwear as claimed in claim 1 in which the chemical composition and physical characteristics of the molding material injected into the second cavity differs from the chemical composition and physical characteristics of the molding material injected into the first cavity.

(References on following page)

References Cited

UNITED STATES PATENTS

| | | | |
|---|---|---|---|
| 3,463,849 | 8/1969 | Winkler | 264—244 |
| 3,474,496 | 8/1969 | Klee | 264—328 X |
| 2,811,744 | 11/1957 | Baldanza | 264—247 X |
| 2,619,679 | 12/1952 | Baldanza | 264—247 X |
| 3,272,902 | 9/1966 | Ludwig | 264—244 |
| 3,160,921 | 12/1964 | Ludwig | 264—244 X |
| 3,284,558 | 11/1966 | Ludwig | 264—244 |
| 3,302,243 | 2/1967 | Ludwig | 264—244 X |
| 3,305,895 | 2/1967 | Ludwig | 264—244 X |
| 3,376,608 | 4/1968 | Wilcox | 18—42 |

ROBERT F. WHITE, Primary Examiner

R. R. KUCIA, Assistant Examiner

U.S. Cl. X.R.

264—247, 328